(12) United States Patent
Ringer

(10) Patent No.: US 11,180,078 B2
(45) Date of Patent: Nov. 23, 2021

(54) SAFETY SIGN DEVICE WITH MODULAR DUAL SIGNS AND RELATED METHODS

(71) Applicant: Danny Ringer, Daytona Beach, FL (US)

(72) Inventor: Danny Ringer, Daytona Beach, FL (US)

( * ) Notice: Subject to any disclaimer, the term of this patent is extended or adjusted under 35 U.S.C. 154(b) by 0 days.

(21) Appl. No.: 17/021,142

(22) Filed: Sep. 15, 2020

(65) Prior Publication Data

US 2020/0406816 A1    Dec. 31, 2020

Related U.S. Application Data

(63) Continuation of application No. 16/505,848, filed on Jul. 9, 2019, now Pat. No. 10,780,823, which is a continuation of application No. 16/040,646, filed on Jul. 20, 2018, now Pat. No. 10,343,598, which is a continuation-in-part of application No. 15/595,015, filed on May 15, 2017, now Pat. No. 10,062,309.

(51) Int. Cl.
*B60Q 1/50* (2006.01)
*B60Q 1/26* (2006.01)
*B60R 21/34* (2011.01)
*B60R 21/00* (2006.01)

(52) U.S. Cl.
CPC .......... *B60Q 1/503* (2013.01); *B60Q 1/2615* (2013.01); *B60Q 1/2692* (2013.01); *B60Q 1/50* (2013.01); *B60R 21/34* (2013.01); *B60R 2021/0067* (2013.01)

(58) Field of Classification Search
CPC ... G09F 21/048; G09F 7/18; G09F 2007/1865
See application file for complete search history.

(56) References Cited

U.S. PATENT DOCUMENTS 4,565,152 A * 1/1986 Bennett ................. B60Q 1/50
                                                                116/173
4,825,192 A * 4/1989 Wells ...................... B60R 19/38
                                                                 116/32

(Continued)

OTHER PUBLICATIONS

Stop Arm Fixed Extension (S.A.F.E.) Gates; http://web.archive.org/web/20160307063520/http://safegates.net/ Retreived from internet on Jun. 7, 2017; pp. 5. ***See U.S. Appl. No. 16/505,848.

*Primary Examiner* — Gary C Hoge
(74) *Attorney, Agent, or Firm* — Allen, Dyer, Doppelt + Gilchrist, PA

(57) ABSTRACT

A safety sign device is for a vehicle. The safety sign device includes a first sign having proximal and distal end, a first hinge being coupled to the proximal end of the first sign, the first hinge being coupled to a side of the vehicle, and a second sign being coupled to the side of the vehicle and being substantially parallel to the side of the vehicle. The first hinge is configured to extend and retract the first sign between a retracted position and an extended position. The first and second signs may be transverse to each other in the extended position, and may be flat against the side of the vehicle in the retracted position. The safety sign device includes a first flexible arm coupled to the first hinge and having an elongate housing, and visual indicators carried by the elongate housing.

20 Claims, 8 Drawing Sheets

(56) References Cited

U.S. PATENT DOCUMENTS

| | | | | |
|---|---|---|---|---|
| 5,038,136 A * | 8/1991 | Watson | B60Q 1/50 | 340/480 |
| 6,213,047 B1 * | 4/2001 | Means | B60Q 1/2692 | 116/28 R |
| 6,765,481 B2 * | 7/2004 | Haigh | G09F 21/04 | 116/28 R |
| 7,474,201 B2 * | 1/2009 | Swanger | B60Q 1/50 | 340/433 |
| 7,938,594 B1 | 5/2011 | Schindler | | |
| 8,820,628 B2 | 9/2014 | McKinnon | | |
| 9,032,652 B2 | 5/2015 | Barker | | |
| 9,245,465 B1 * | 1/2016 | Geyer | B60Q 1/2692 | |
| 2003/0070603 A1 * | 4/2003 | VanderMolen | B60Q 1/50 | 116/28 R |
| 2004/0232859 A1 * | 11/2004 | Phillips | B60Q 1/50 | 318/1 |
| 2005/0200461 A1 * | 9/2005 | Redfield | B60Q 1/50 | 340/433 |
| 2007/0252538 A1 * | 11/2007 | Swanger | B60Q 1/2692 | 318/3 |
| 2008/0157945 A1 * | 7/2008 | Bowler | G08G 1/0175 | 340/433 |
| 2008/0169918 A1 * | 7/2008 | Vidri | B60Q 1/2692 | 340/487 |
| 2008/0282964 A1 * | 11/2008 | Bennett | B60Q 7/02 | 116/28 R |
| 2009/0109009 A1 * | 4/2009 | Gumbel | B60Q 9/00 | 340/433 |
| 2012/0013454 A1 * | 1/2012 | Krugh, IV | B60Q 1/50 | 340/433 |
| 2012/0111261 A1 * | 5/2012 | Schmitt | B60Q 1/50 | 116/28 R |
| 2016/0096469 A1 * | 4/2016 | O'Brien | B60Q 1/50 | 116/63 R |
| 2016/0347247 A1 * | 12/2016 | Espey | B60Q 1/305 | |

* cited by examiner

SAFETY SIGN DEVICE WITH MODULAR DUAL SIGNS AND RELATED METHODS

RELATED APPLICATIONS

This application is a continuation of application Ser. No. 16/505,848 filed Jul. 9, 2019, now U.S. Pat. No. 10,780,823, which is a continuation of application Ser. No. 16/040,646 filed Jul. 20, 2018, now U.S. Pat. No. 10,343,598, which is a continuation-in-part of application Ser. No. 15/595,015 filed May 15, 2017, now U.S. Pat. No. 10,062,309, which are hereby incorporated herein in their entireties by reference.

TECHNICAL FIELD

The present disclosure relates to the field of safety devices, and, more particularly, to a school bus safety device and related methods.

BACKGROUND

Given the primary purpose of a school bus vehicle, these vehicles include several safety devices. Indeed, governmental regulation, both federal and state level, require certain features. In particular, the Federal Motor Vehicle Safety Standards (FMVSS) for School Buses requires school bus pedestrian safety devices, for example, a stop signal arm, roll over protection, body joint strength, and passenger seating and crash protection. Of course, the federal and state regulations merely establish a floor requirement for safety devices, and there is a robust market for supplemental safety devices, such as the near ubiquitous school bus crossing arm.

Federal regulations define the "[s]top signal arm means [as] a device that can be extended outward from the side of a school bus to provide a signal to other motorists not to pass the bus because it has stopped to load or discharge passengers." 49 C.F.R. § 571.131. Regulations mandate the shape and font lettering size for the stop signal arm. Nevertheless, there have been several approaches to improving the visibility of the stop signal arm.

For example, U.S. Pat. No. 9,245,465 to Geyer et al. discloses another approach to the stop signal arm device. This device extends further into the adjacent lane to reduce instances in which motorists pass a stopped school bus. A first frame is permanently secured to conventional stop sign mechanism. A second breakaway frame or arm is attachable to and detachable from the first frame, and extends beyond the conventional stop sign. If a vehicle strikes the second frame, it separates without significantly damaging the conventional stop sign mechanism. The extension arm can be moved between a retracted and extended position by the same mechanism that opens and closes the conventional stop sign, or with a new mechanism entirely.

SUMMARY

Generally, a safety sign device is for a vehicle. The safety sign device may include a first sign having proximal and distal end, a first hinge being coupled to the proximal end of the first sign, the first hinge being coupled to a side of the vehicle, and a second sign being coupled to the side of the vehicle and being substantially parallel to the side of the vehicle. The first hinge may be configured to extend and retract the first sign between a retracted position and an extended position. The first and second signs may be transverse to each other in the extended position, and may be flat against the side of the vehicle in the retracted position. The safety sign device may include a first flexible arm coupled to the first hinge and comprising an elongate housing, and a plurality of visual indicators carried by the elongate housing, the first flexible arm being substantially parallel to the first sign.

In particular, the second sign may be immovably fixed to the side of the vehicle. The safety sign device may also include an L-shaped arm coupled between the first hinge and the first flexible arm. The first flexible arm may comprise an elastic base coupled between the elongate housing and the first sign. The plurality of visual indicators may be configured to be activated when the first sign is in the extended position. The elongate housing may comprise opposing first and second longitudinal sides, and the plurality of visual indicators may be carried on both of the opposing first and second longitudinal sides. The plurality of visual indicators may include, for example, a plurality of light emitting diodes (LEDs).

Additionally, the safety sign device may also include a motor configured to toggle the first sign between the extended position and the retracted position. The safety sign device may further include a third sign having proximal and distal ends, and a third hinge being coupled to the proximal end of the third sign. The third hinge may be coupled to the side of the vehicle spaced apart from the first hinge. The safety sign device may also comprise a second flexible arm coupled to the distal end of the third sign and comprising an elongate housing, and a plurality of visual indicators carried by the elongate housing, the second flexible arm being substantially parallel to the third sign.

Another aspect is directed to a method of making a safety sign device for a vehicle. The method may include coupling a first hinge to a proximal end of a first sign, the first hinge being coupled to a side of the vehicle, and coupling a second sign to the side of the vehicle and being substantially parallel to the side of the vehicle. The first hinge may be configured to extend and retract the first sign between a retracted position and an extended position. The first and second signs may be transverse to each other in the extended position, and be flat against the side of the vehicle in the retracted position. The method may also include coupling a first flexible arm to the first hinge, the first flexible arm comprising an elongate housing, and a plurality of visual indicators carried by the elongate housing, the first flexible arm being substantially parallel to the first sign.

DETAILED DESCRIPTION

Figure 1:
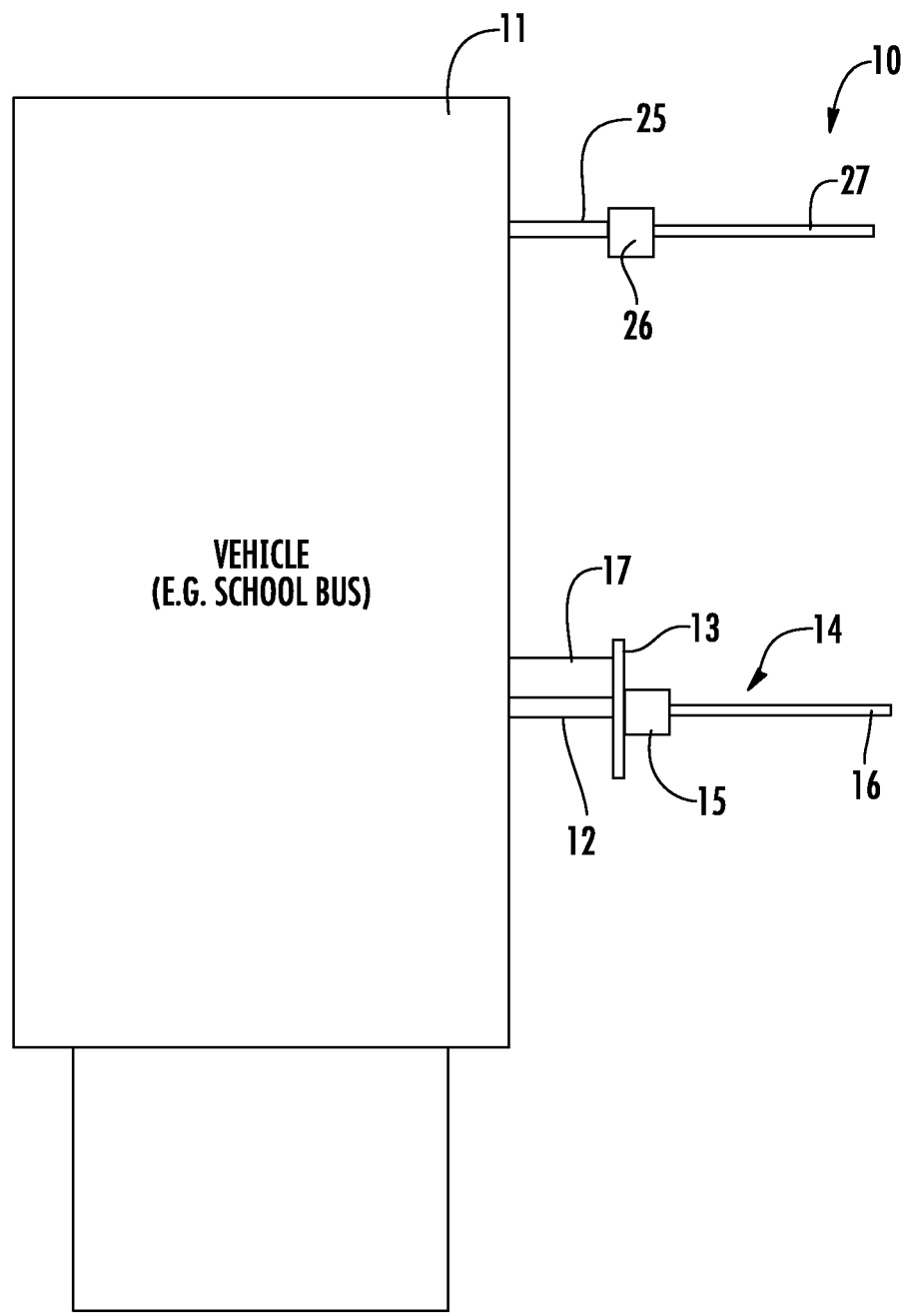
FIG. 1 is a schematic diagram of a safety sign device and associated vehicle, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-4, a safety sign device 10 according to the present disclosure is now described. The safety sign device 10 is illustratively attached to a vehicle 11. The vehicle 11 may comprise, for example, a school bus (providing a stop signal device), or a truck. The safety sign device 10 illustratively includes a first sign (e.g. a stop sign) 12 having proximal (i.e. closer to the vehicle) and distal (i.e. further from the vehicle) ends, and a first hinge 19 being coupled to the proximal end of the first sign. The first hinge 19 is also coupled to a side of the vehicle 11.

Figure 2:
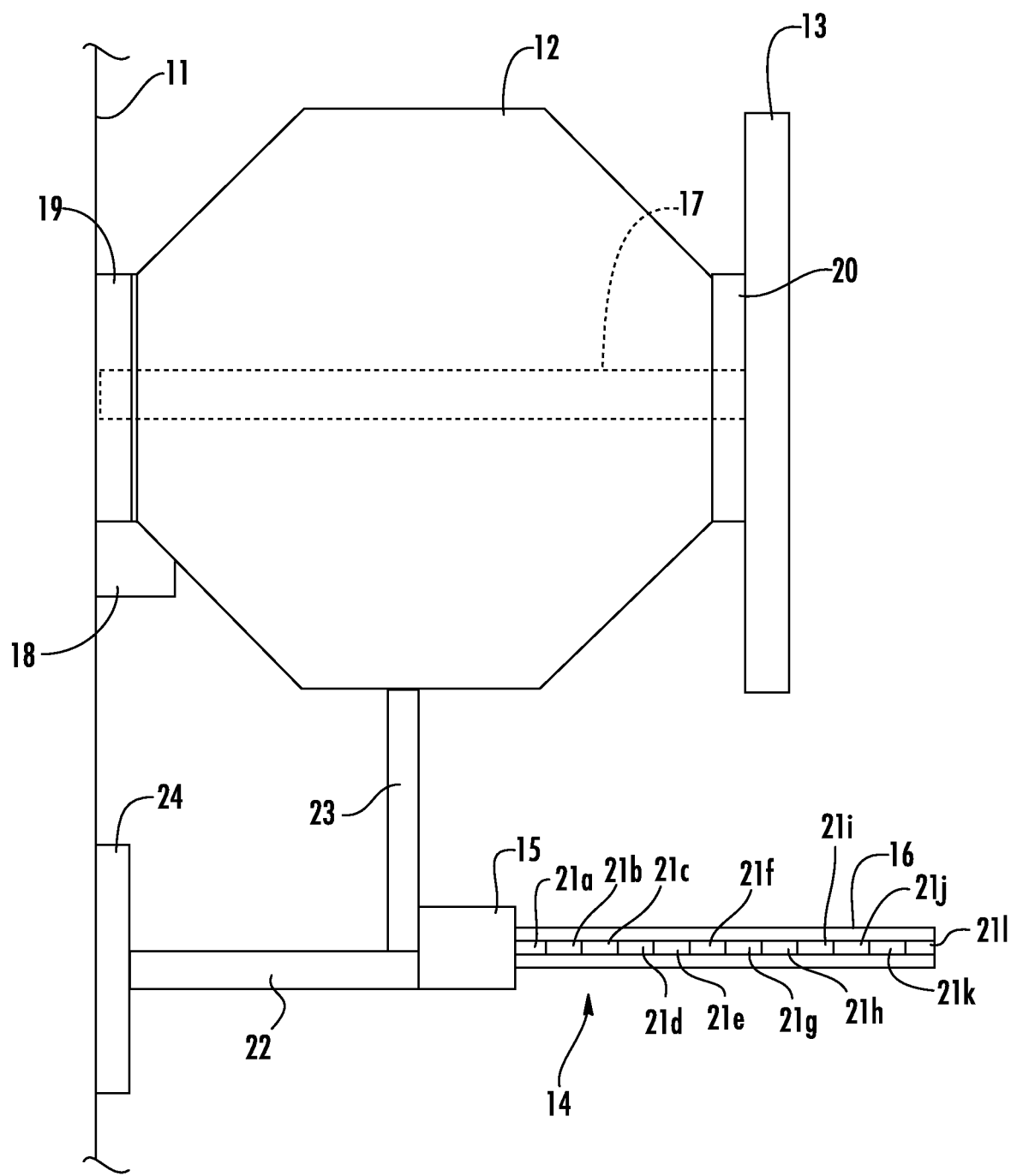
FIG. 2 is a front view of the safety sign device in an extended position.
Figure 3:
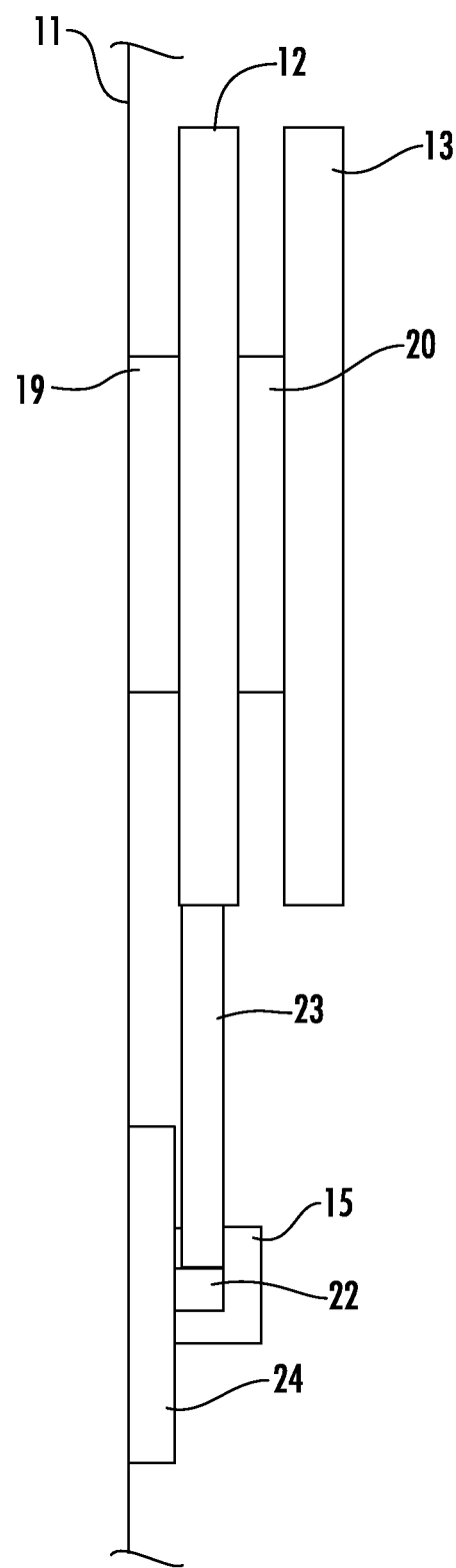
FIG. 3 is a front view of the safety sign device in a retracted position.
Figure 4:
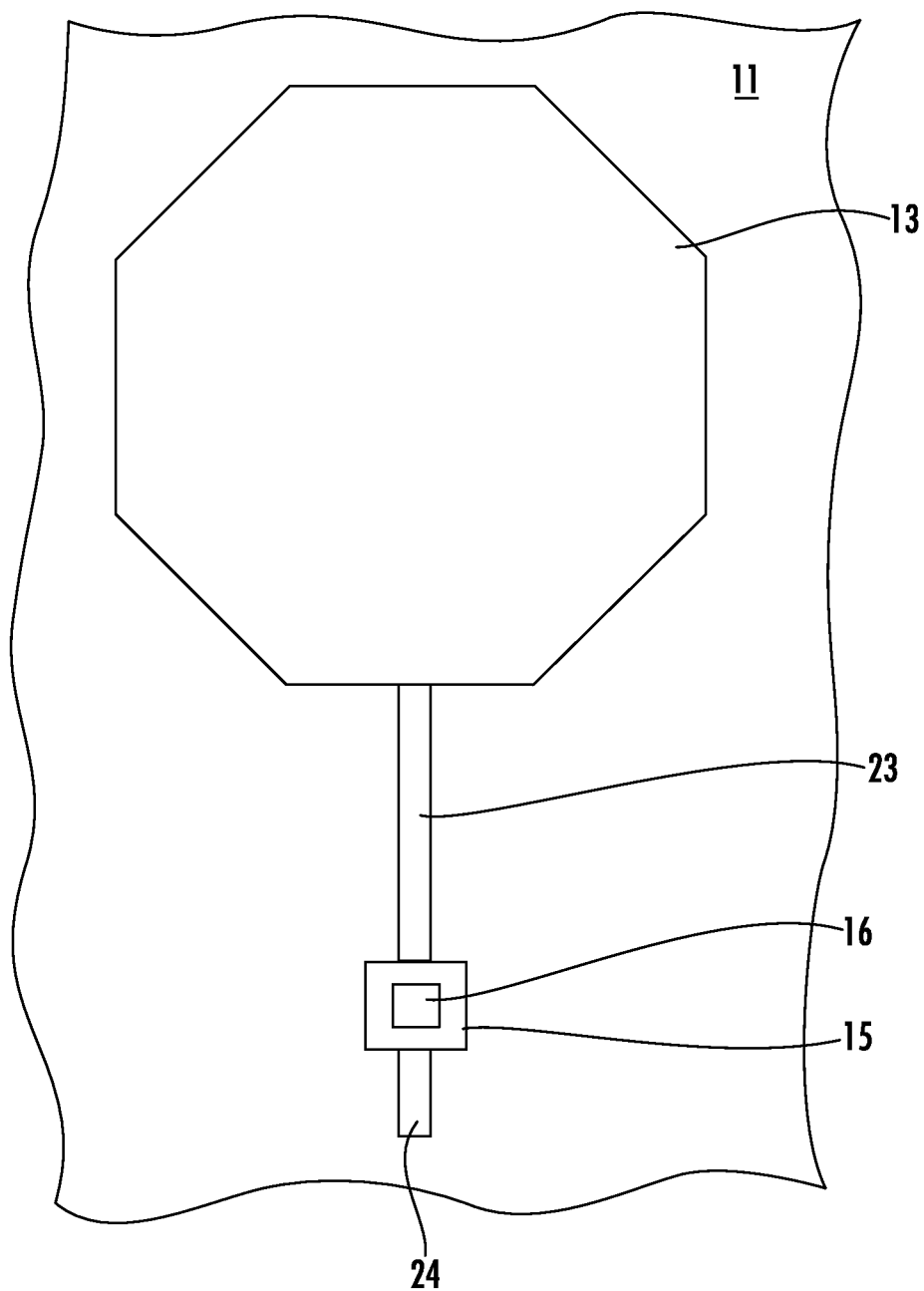
FIG. 4 is a side elevational view of the safety sign device in the extended position.

The safety sign device 10 illustratively includes a second hinge 20 being coupled to the distal end of the first sign 12, and a second sign (e.g. a stop sign) 13 having a medial portion coupled to the second hinge, thereby providing a dual hinged/dual signed safety sign device. The first and second hinges 19, 20 are coupled at opposite sides of the first sign 12. The safety sign device 10 illustratively includes an arm 17 coupled between the second sign 13 and the side of the vehicle 11 and configured to extend and retract the first and second signs 12-13 between a retracted position (FIG. 3) and an extended position (FIG. 2).

As will be appreciated, in the school bus application, the first and second signs 12-13 would be in the extended position when stopped and transferring passengers. The first and second signs 12-13 are transverse to each other in the extended position. In particular, the first and second signs 12-13 are substantially perpendicular to each other in the extended position, i.e. between 75-105 degrees.

Also, the first and second signs 12-13 are flat against the side of the vehicle 11 in the retracted position. As will be appreciated, in the school bus application, the first and second signs 12-13 would be in the retracted position when the vehicle 11 is in motion. In other words, the first and second signs 12-13 are substantially parallel to each other in the retracted position, i.e. within 20 degrees of parallel to each other.

The safety sign device 10 further illustratively includes a first flexible arm 14 coupled to the first sign 12 and comprising an elongate housing 16, and a plurality of visual indicators 21a-211 carried by the elongate housing. In some embodiments, the plurality of visual indicators 21a-211 comprises text based indicators, such as "stop", "slow", "caution", which may be selectively activated via embedded light sources.

The first flexible arm 14 is substantially parallel to the first sign 12. In particular, in a rest/non-flexed state, the first flexible arm 14 is within 20 degrees of parallel to the first sign 12. Helpfully, the first flexible arm 14 enhances visibility, and readily flexes to impact from errant vehicles.

In particular, the first flexible arm 14 illustratively includes an elastic base 15 coupled between the elongate housing 16 and the first sign 12. For example, the elastic base 15 may comprise a plurality of springs, a double barreled hinge, or a 180 degree swivel hinge. In some embodiments, the elastic base 15 includes a plurality of aligned heavy duty springs. In other embodiments, the elastic base 15 may comprise a flexible polymer base having an H-shape. For example, the elastic base 15 may be constituted similarly to the lower portion of the traffic beacon disclosed in U.S. Pat. No. 7,938,594 to Schindler, the entire contents of which are hereby incorporated by reference.

In fact, due to the elastic base 15, if the first flexible arm 14 is impacted during an accident, the elongate housing 16 will readily bend away and return to its original position. Helpfully, the first flexible arm 14 is resistant to damage and inflicts little damage on the other vehicle. This is contrast to the breakaway approach of U.S. Pat. No. 9,245,465 to Geyer et al., which is costly to repair. Moreover, the light weight approach of the safety sign device 10 is readily retrofitted onto existing stop signal devices.

Also, the first flexible arm 14 has lower position close to the ground, than the approach of the '465 patent, which makes it more difficult for errant vehicles to drive under the warning arm. The first flexible arm 14 also extends longitudinally further out than the approach of the '465 patent, which enhances visibility.

In another embodiment, the elongate housing 16 of the first flexible arm 14 may comprise a rubberized external layer (other materials could be used, e.g., foam plastic). Helpfully, this rubberized external layer prevents damage to errant vehicles. Also, the external layer prevents inadvertent damage to a paint layer of the side of the vehicle 11.

The plurality of visual indicators 21a-211 is configured to be activated when the first and second signs 12-13 are in the extended position. In some embodiments, the elongate housing 16 comprises opposing first and second longitudinal sides, and the plurality of visual indicators 21a-211 is to be carried on both of the opposing first and second longitudinal sides. Additionally, the plurality of visual indicators 21a-211 may comprise a plurality of LEDs.

In some embodiments, the elongate housing 16 may comprise an anti-ballistic plastic material. In other embodiments, the elongate housing 16 may comprise a metallic material or cellulose material (e.g. wood material).

In the illustrated embodiment, the safety sign device 10 further illustratively includes a fourth hinge 24, and first and second supports 22-23 coupled between the fourth hinge and the first sign 12. The first flexible arm 14 is coupled to a medial joint of the first and second supports 22-23. In other embodiments, the first flexible arm 14 may be coupled directly to the first sign 12, thereby eliminating the first and second supports 22-23.

The safety sign device 10 illustratively includes a motor 18 coupled to the arm 17 and configured to toggle the first and second signs 12-13 between the extended and retracted positions. In some embodiments, the motor 18 may be alternatively coupled to the first hinge 19 for extending the first sign 12. Advantageously, via the action of the arm 17 and the second hinge 20, the second sign 13 rotates outward into the transverse position.

Figure 5:
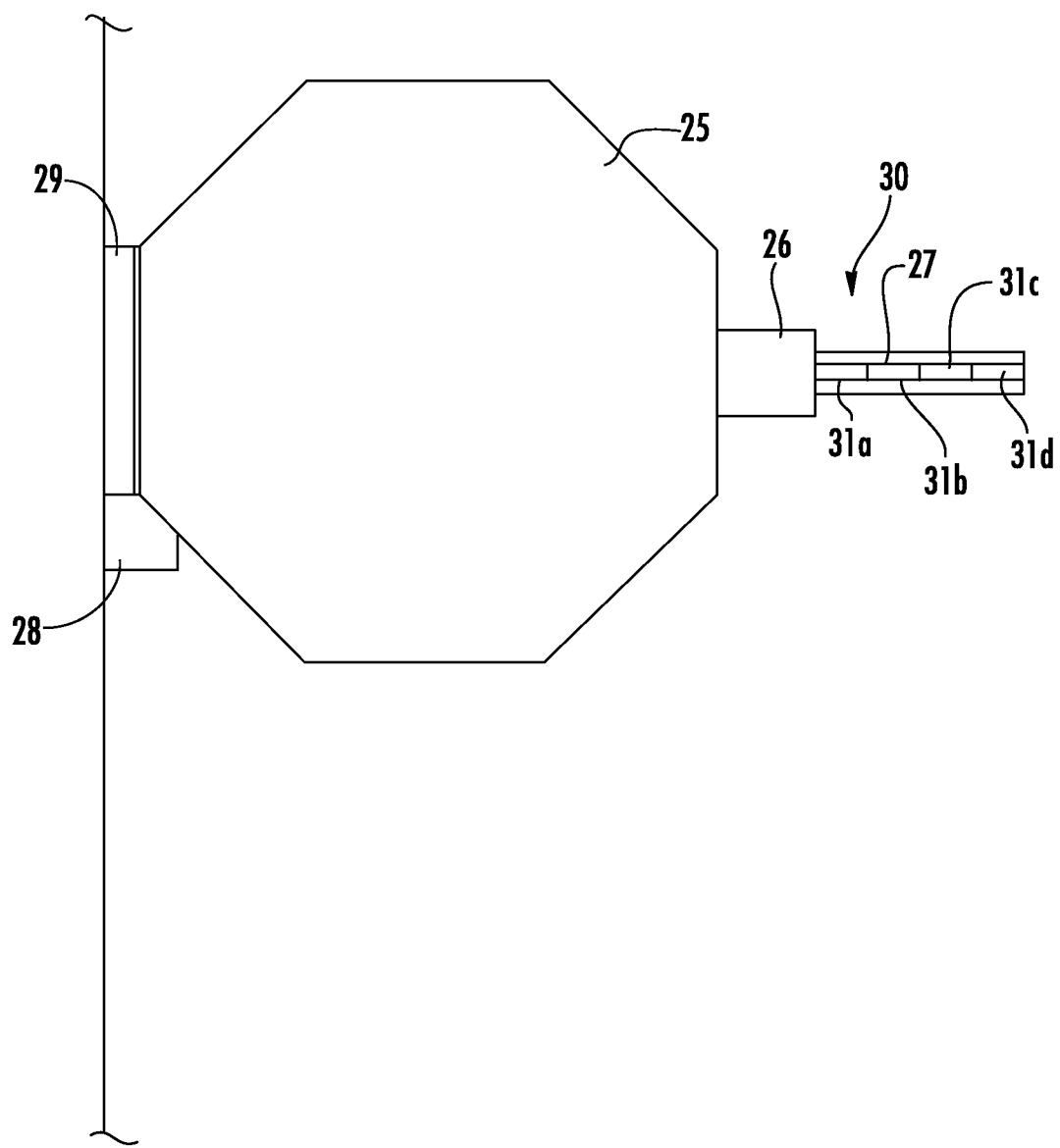
FIG. 5 is a front view of a third sign in an example embodiment of the safety sign device in an extended position.

Referring now additionally to FIG. 5, the safety sign device 10 illustratively includes a third sign 25 having proximal and distal ends, and a third hinge 29 being coupled to the proximal end of the third sign. The third hinge 29 is coupled to the side of the vehicle 11 spaced apart from the first hinge 19 and adjacent a rear of the vehicle. The safety sign device 10 illustratively includes a second flexible arm 30 coupled to the distal end of the third sign 25. The second flexible arm 30 illustratively includes an elastic base 26 coupled to the distal end of the third sign 25, an elongate housing 27 coupled to the elastic base, and a plurality of visual indicators 31a-31d carried by the elongate housing.

The safety sign device 10 illustratively includes an additional motor 28, and a third hinge 29 powered by the motor to switch between retracted and extended (FIG. 5) positions. In the extended position, the second flexible arm 30 is substantially parallel to the third sign 25. In particular, in a rest/non-flexed state, the second flexible arm 30 is within 20 degrees of parallel to the third sign 25. In the retracted position, the third sign 25 and the second flexible arm 30 are flat against the side of the vehicle 11. In other words, the third sign 25 is substantially parallel to the side of vehicle 11, i.e. within 20 degrees of parallel to each other.

In some embodiments, the motors 18, 28 may be onboard motors provided by the vehicle 11. In other embodiment, the motors 18, 28 be modular and separate from the original vehicle, i.e. aftermarket.

Figure 6:
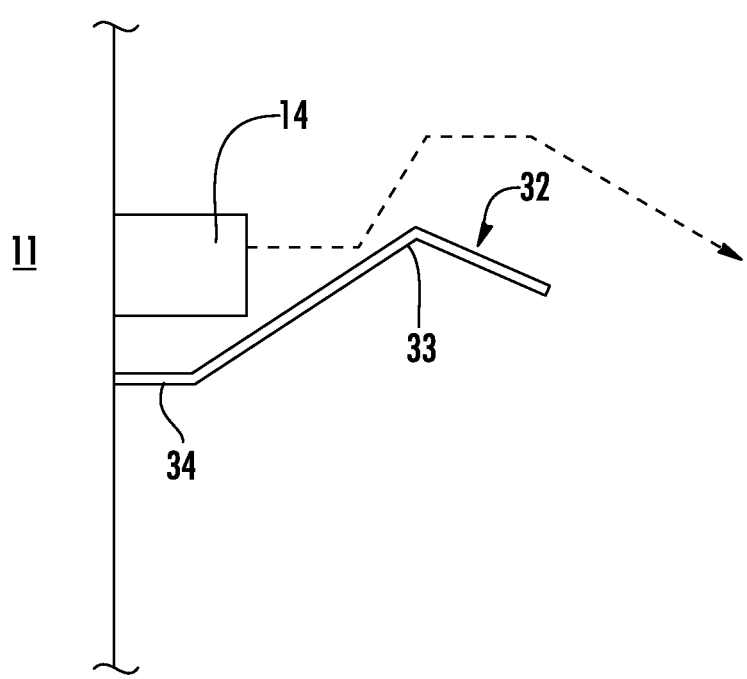
FIG. 6 is a front view of a retention device in an example embodiment of the safety sign device in a retracted position.

In yet another embodiment (FIG. 6), the safety sign device 10 illustratively includes a retention device 32 coupled to the side of the vehicle 11. The retention device 32 is configured to retain the first flexible arm 14 firmly and securely against the side of the vehicle 11 while in the retracted position. Advantageously, this feature also prevents inadvertent damage to the paint layer of the side of the vehicle 11 from movement during motion of the vehicle. The retention device 32 may comprise a flexible retention arm with a medial bump 33 configured to require the first flexible arm 14 to flex upward and out (see dashed line in FIG. 6) when being moved out of the retracted position. The retention device 32 also includes a proximal portion 34 extending outward from the side of the vehicle 11. In other embodiments, the retention device 32 may comprise an interface lock, a magnetic lock, or a spring loaded locking mechanism.

In another embodiment, the safety sign device 10 illustratively includes an image sensor device, and associated memory/processing circuitry coupled thereto. In this embodiment, the safety sign device 10 also includes a sensor configured to detect when the first flexible arm 14 is flexed beyond a threshold limit while in the extended position, for example, greater than 20 degrees from rest position (threshold degree could be between 10-45 degrees). When the sensor is triggered, the image sensor device would record the area adjacent and underneath the first flexible arm 14 for record keeping purposes.

Another aspect is directed to a method for making a safety sign device 10 for a vehicle 11. The method includes coupling a first hinge 19 to a proximal end of a first sign 12, the first hinge being coupled to a side of the vehicle 11, coupling a second hinge 20 to a distal end of the first sign, and coupling a medial portion of a second sign 13 to the second hinge. The method also includes coupling an arm 17 between the second sign 13 and the side of the vehicle 11, the arm configured to extend and retract the first and second signs 12-13 between a retracted position and an extended position. The first and second signs 12-13 are transverse to each other in the extended position, and are flat against the side of the vehicle 11 in the retracted position. The method comprises coupling a first flexible arm 14 to the first sign 12 and comprising an elongate housing 16, and a plurality of visual indicators 21a-21l carried by the elongate housing, the first flexible arm being substantially parallel to the first sign.

Figure 7:
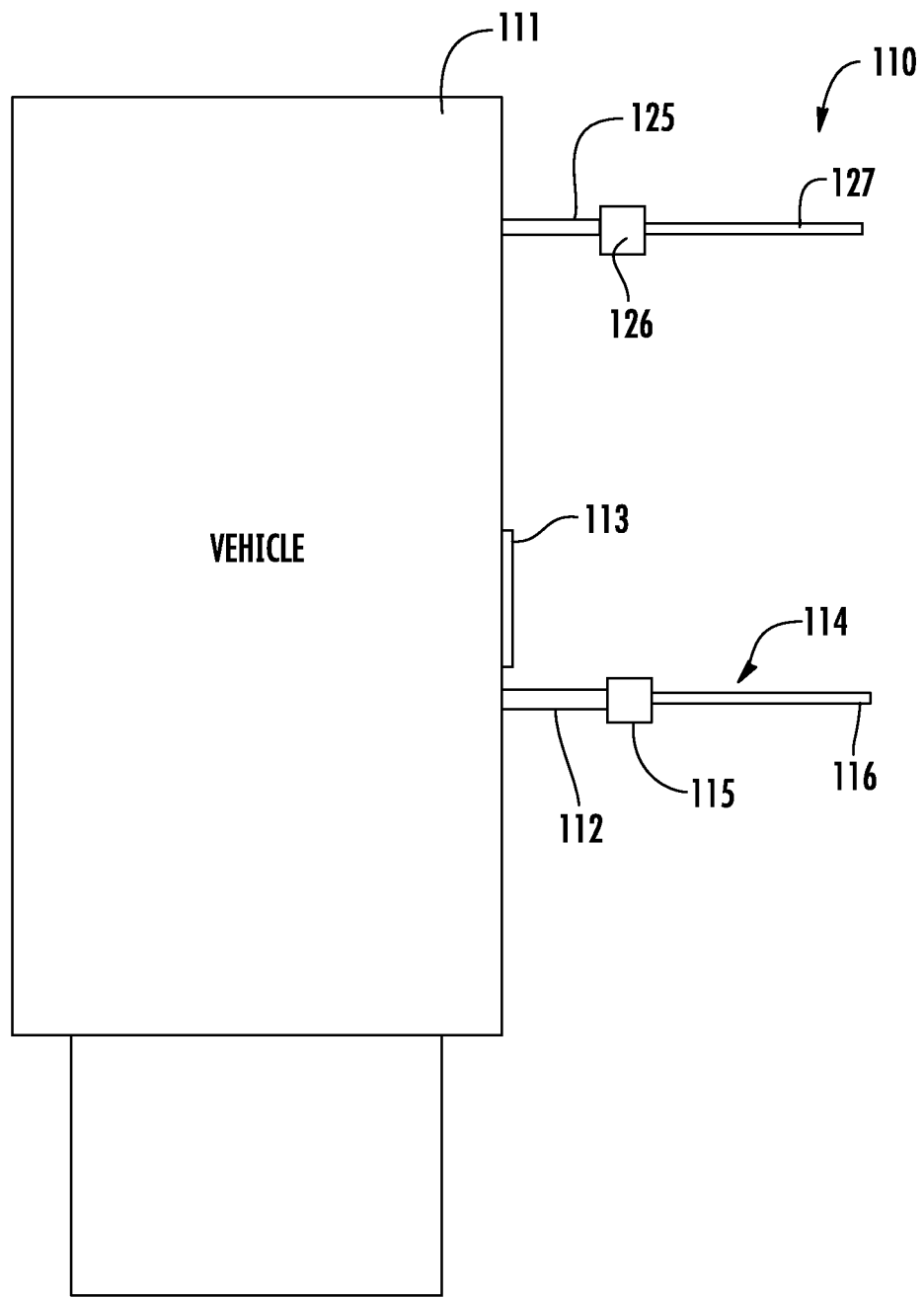
FIG. 7 is a schematic diagram of another embodiment of the safety sign device and associated vehicle, according to the present disclosure.
Figure 8:
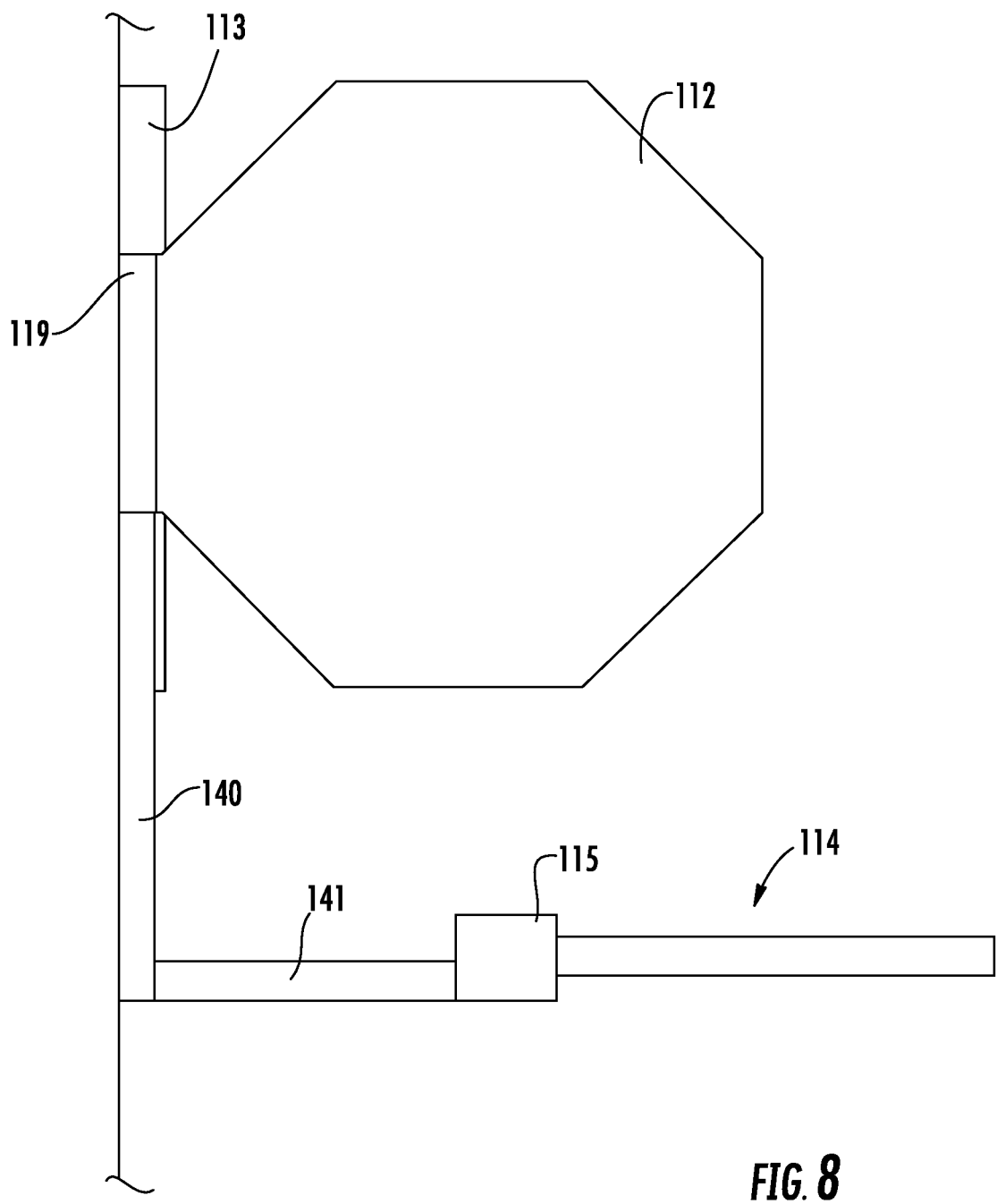
FIG. 8 is a front view of the safety sign device of FIG. 7 in an extended position.

Referring now additionally to FIGS. 7-8, another embodiment of the safety sign device 110 is now described. In this embodiment of the safety sign device 110, those elements already discussed above with respect to FIGS. 1-6 are incremented by 100 and most require no further discussion herein. This embodiment differs from the previous embodiment in that this safety sign device 110 illustratively includes a first sign 112 having proximal and distal end, and a first hinge 119 being coupled to the proximal end of the first sign. The first hinge 119 is illustratively coupled to a side of the vehicle 111.

The safety sign device 110 illustratively includes a second sign 113 being coupled to the side of the vehicle 111 and being substantially parallel (±20° within parallel) to the side of the vehicle. The first hinge 119 is configured to extend and retract the first sign 112 between a retracted position (i.e. flat against the side of the vehicle 111) and an extended position, as perhaps best seen in FIG. 8 (i.e. substantially perpendicular with the side of the vehicle: 75-105 degrees of angle). The first and second signs 112, 113 are transverse to each other in the extended position. In particular, the first and second signs 112, 113 are substantially perpendicular to each other in the extended position, i.e. between 75-105 degrees. The first and second signs 112, 113 may be flat (i.e. substantially parallel to the side of vehicle) against the side of the vehicle 111 in the retracted position.

The safety sign device 110 illustratively includes a first flexible arm 114 coupled to the first hinge 119 and comprising an elongate housing 116, and a plurality of visual indicators carried by the elongate housing. The first flexible arm 114 is substantially parallel to the first sign 112. In particular, in a rest/non-flexed state, the first flexible arm 114 is within 20 degrees of parallel to the first sign 112.

In particular, the second sign 113 is immovably fixed to the side of the vehicle 111, and is permanently mounted, which in contrast to the embodiments of FIGS. 1-6. The safety sign device 110 illustratively includes an L-shaped arm 140-141 coupled between the first hinge 119 and the first flexible arm 114. Since the L-shaped arm 140-141 is coupled to the first hinge 119, when the first sign 112 is placed in the extended position, the L-shaped arm 140-141 is also similarly extended via rotation.

Of course, the L-shaped arm 140-141 is merely exemplary and could be shaped differently, such as canted single arm. The L-shaped arm 140-141 may comprise a material (e.g. steel, aluminum) of sufficient mechanical strength to carry the first flexible arm 114 and absorb potential impact from errant vehicles.

Although not shown in this embodiment, the safety sign device 110 may include a motor coupled to the first hinge 119 and configured to toggle the first sign 112 between the extended and retracted positions. In some embodiments, the vehicle 111 includes a control panel (mounted on the interior for use by the driver) for actuating the motor. The control panel would permit selective actuation of the motor and temporary disablement of the actuation when the vehicle lacks the clearance to extend the first flexible arm 114.

In some embodiments, the motor may be actuated via a wired/wireless remote control, and in other embodiments, the safety sign device 110 may include a controller with a wireless transceiver (e.g. cellular transceiver, IEEE 802.11x transceiver, Bluetooth transceiver). The wireless transceiver would permit remote actuation of the motor over the Internet, such as via a mobile cellular phone software application.

Also, in the illustrated embodiment, the safety sign device 110 is mounted to a longitudinal side of the vehicle 111. In other embodiments, the safety sign device 110 can be mounted to a rear side or a front side of the vehicle 111. In yet other embodiments, the safety sign device 110 can mounted on a tailgate lift or platform attached to the side of the vehicle 111.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A safety sign device for a vehicle, the safety sign device comprising:
    a sign having proximal and distal ends;
    a first hinge being coupled between the proximal end of said sign and a side of the vehicle; and
    a flexible arm coupled to said first hinge and comprising
        an elongate housing,
        an elastic base coupled to said elongate housing, and
        a plurality of visual indicators carried by said elongate housing, said flexible arm being substantially parallel to said sign;
    said first hinge configured to extend and retract said flexible arm and said sign between a retracted position and an extended position.

2. The safety sign device of claim 1 further comprising an L-shaped arm coupled between said first hinge and said flexible arm.

3. The safety sign device of claim 1 wherein said plurality of visual indicators is configured to be activated when said sign is in the extended position.

4. The safety sign device of claim 1 wherein said elongate housing comprises opposing first and second longitudinal sides; and wherein said plurality of visual indicators are carried on both of said opposing first and second longitudinal sides.

5. The safety sign device of claim 1 wherein said plurality of visual indicators comprises a plurality of light emitting diodes (LEDs).

6. The safety sign device of claim 1 further comprising a motor configured to toggle said sign between the extended position and the retracted position.

7. The safety sign device of claim 1 further comprising an image sensor, and a sensor coupled to said image sensor and configured to detect when said flexible arm is flexed beyond a threshold limit while in the extended position.

8. The safety sign device of claim 7 wherein when said sensor is triggered, said image sensor device is configured to record an area adjacent said flexible arm.

9. The safety sign device of claim 1 wherein said elongate housing comprises a plastic base, and a deformable external layer.

10. A safety sign device for a vehicle, the safety sign device comprising:
    a sign having proximal and distal ends;
    a first hinge being coupled between the proximal end of said sign and a side of the vehicle; and
    a flexible arm coupled to said first hinge and comprising
        an elongate housing comprising opposing first and second longitudinal sides,
        an elastic base coupled to said elongate housing, and
        a plurality of visual indicators carried by both of said opposing first and second longitudinal sides of said elongate housing, said flexible arm being substantially parallel to said sign;
    said first hinge configured to extend and retract said flexible arm and said sign between a retracted position and an extended position;
    said plurality of visual indicators configured to be activated when said sign is in the extended position.

11. The safety sign device of claim 10 further comprising an L-shaped arm coupled between said first hinge and said flexible arm.

12. The safety sign device of claim 10 wherein said plurality of visual indicators comprises a plurality of light emitting diodes (LEDs).

13. The safety sign device of claim 10 further comprising a motor configured to toggle said sign between the extended position and the retracted position.

14. The safety sign device of claim 10 further comprising an image sensor, and a sensor coupled to said image sensor and configured to detect when said flexible arm is flexed beyond a threshold limit while in the extended position.

15. The safety sign device of claim 14 wherein when said sensor is triggered, said image sensor device is configured to record an area adjacent said flexible arm.

16. The safety sign device of claim 10 wherein said elongate housing comprises a plastic base, and a deformable external layer.

17. A method for making a safety sign device for a vehicle, the method comprising:
    coupling a first hinge between a proximal end of a sign and a side of the vehicle; and
    coupling a flexible arm to the first hinge, the flexible arm comprising
        an elongate housing,
        an elastic base coupled to the elongate housing, and
        a plurality of visual indicators carried by the elongate housing, the flexible arm being substantially parallel to the sign;
    the first hinge configured to extend and retract the flexible arm and the sign between a retracted position and an extended position.

18. The method of claim 17 further comprising coupling an L-shaped arm between the first hinge and the flexible arm.

19. The method of claim 17 wherein the plurality of visual indicators is configured to be activated when the sign is in the extended position.

20. The method of claim 17 wherein the elongate housing comprises opposing first and second longitudinal sides; and wherein the plurality of visual indicators are carried on both of the opposing first and second longitudinal sides.

* * * * *